(No Model.) 3 Sheets—Sheet 2.

C. A. PENNINGTON.
Field Corn Husker.

No. 241,414. Patented May 10, 1881.

WITNESSES:
Fred G. Dieterich
John C. Kenan

INVENTOR:
C. A. Pennington
BY
ATTORNEYS.

(No Model.) 3 Sheets—Sheet 3.
C. A. PENNINGTON.
Field Corn Husker.
No. 241,414. Patented May 10, 1881.
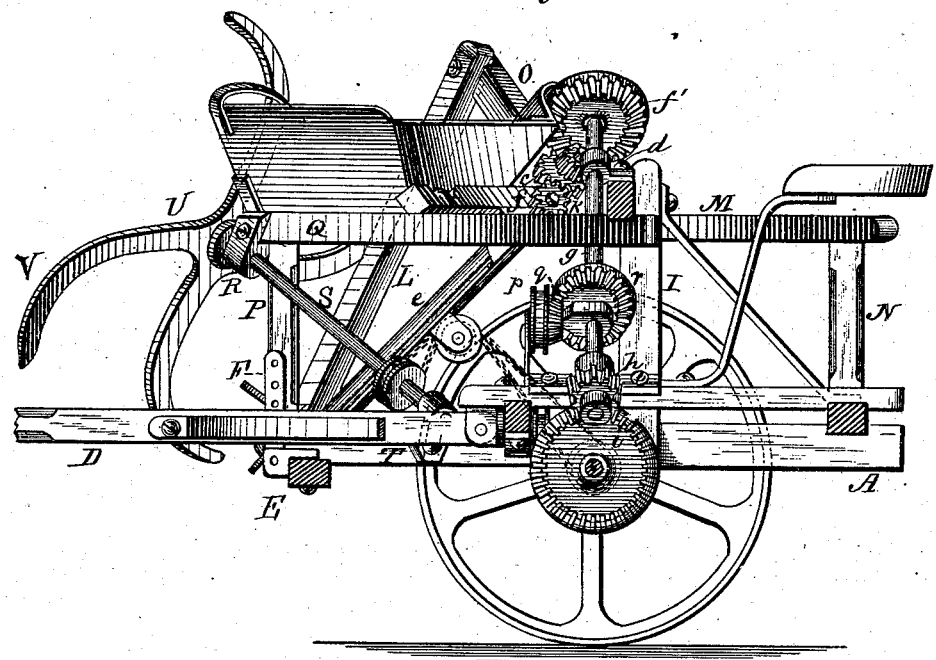
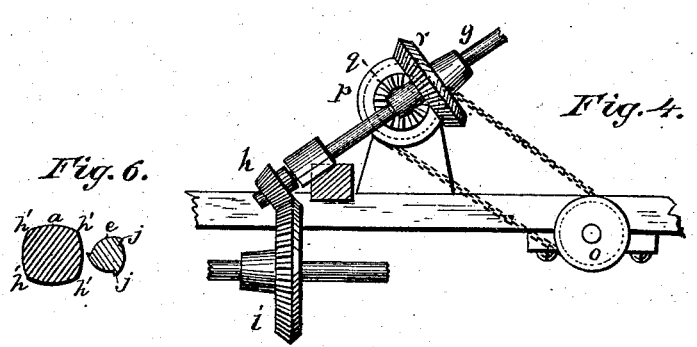
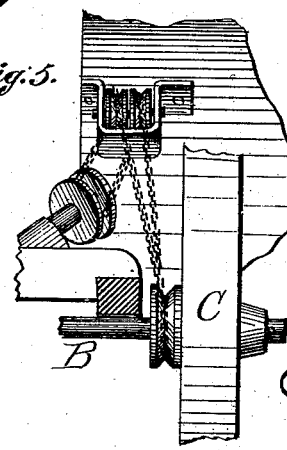
WITNESSES:
Fred G. Dieterich
John C. Kenon
INVENTOR:
C. A. Pennington
BY
ATTORNEYS.

UNITED STATES PATENT OFFICE.

CHARLES A. PENNINGTON, OF CHAMPAIGN, ILLINOIS, ASSIGNOR OF ONE-FOURTH TO JONATHAN B. GREEN, JOHN L. RAY, HENRY TREVETT, JOHN R. TREVETT, ROSS R. MATTIS, WM. B. McKINLEY, DANIEL MORRISEY, AND HARTWELL C. HOWARD, ALL OF SAME PLACE, AND DAVID T. DOBBINS, OF IPAVA, AND E. HOLBROOK, OF WILMINGTON, ILLINOIS.

FIELD CORN-HUSKER.

SPECIFICATION forming part of Letters Patent No. 241,414, dated May 10, 1881.

Application filed March 8, 1881. (No model.)

*To all whom it may concern:*

Be it known that I, CHARLES A. PENNINGTON, of Champaign, Champaign county, Illinois, have invented a new and Improved Field Corn-Husker; and I do hereby declare that the following is a full, clear, and exact description of the same, reference being had to the accompanying drawings, forming part of this specification, in which—

Figure 1:
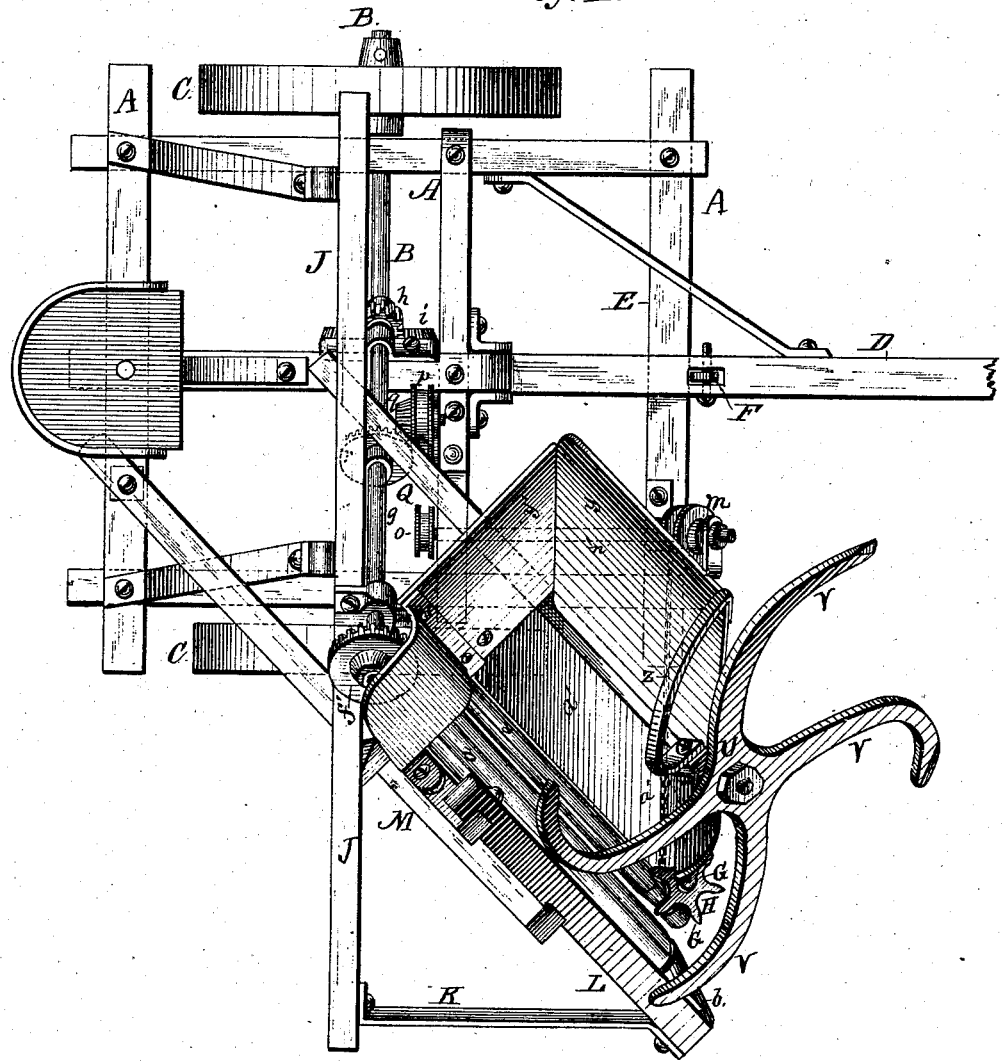
Figure 2:
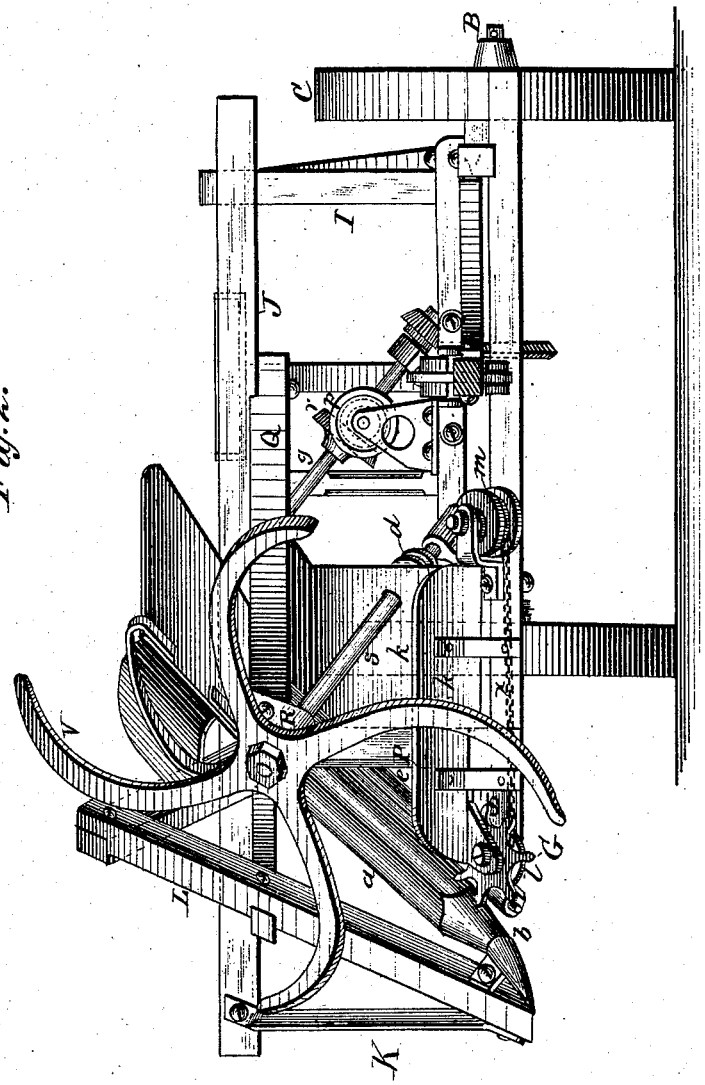

Figure 1 is a plan view of my improved field-husker. Fig. 2 is a front view. Fig. 3 is a side view, partly in section; and Figs. 4, 5, and 6 are detached views.

My invention relates to improvements in field corn-huskers; and it consists, first, in the peculiar construction of the revolving husking-rolls between which the cornstalks are forced and the ears husked.

My invention further consists of a revolving recessed wheel for feeding the stalks carrying the ears between the husking-rolls.

My invention further consists of a fender and guard for the stalks, for the purpose of holding and guiding them while the corn is being husked.

In the accompanying drawings, A represents the main frame of my improved field husker mounted on axle B, having wheels C, and provided with a tongue, D, hinged at its rear end to the middle transverse sill of the main frame A.

To the front sill, E, of the main frame a curved bar, F, provided with holes, is secured, which passes through a slot in the tongue, the latter being provided with a hole for the passage of a pin, by means of which the main frame may be raised and lowered, as desired, to suit the height of the corn to be husked. The front sill, E, of the main frame is continued to one side beyond and in front of the wheels of the machine, and is provided at its end with a revolving feed-wheel, G, provided with a series of recesses, H, each adapted to grasp one or more stalks of corn in its revolution and force them backward into the opening between the revolving husking-rolls.

I I are standards secured to the main frame, to the upper ends of which is secured the horizontal, cross-bar J, provided at its outer end with a brace, K, secured thereto, and inclined downward and attached to the lower end of an inclined fender, L, to which is bolted an inclined piece, M, secured near its rear end to a standard, N, rising from the rear sill of the main frame.

O is a brace bolted to the upper end of the fender and the piece M.

P is a standard bolted to the front sill of the main frame, to the upper end of which is bolted the inclined bar Q, carrying at its front end one of the bearings, R, of the gathering-reel and secured at its rear end to the cross-bar J.

S is the inclined axle of the gathering-reel having its upper bearing at R and its lower bearing in the piece T secured to the main frame.

On the outer end of the axle S is mounted the inclined gathering-reel U, having a series of curved arms V revolving, by suitable gearing, in close proximity to the fender.

$a$ represents a husking-roll made conical or tapering at its lower end to allow a free passage for the stalks in the movement of the machine through the field. The lower end of the revolving husking-roll $a$ has its bearing in a bracket, $b$, bolted to the fender near its lower end, and has its upper bearing in the frame of the machine, and carries at its upper end a spur-gear, $c$, and bevel-pinion $d$.

$e$ represents another inclined husking-roll revolving near the husking-roll $a$, and having its lower end tapered and its lower bearing in a bracket bolted to the front cross-bar of the main frame, the upper end of the husking-roll $e$ having its bearing in the upper frame of the machine, and having on its upper end the spur-gear $f$, which engages with the gear $c$ on the husking-roll $a$, which, through the bevel-pinion $d$, crown-wheel $f'$ on the inclined shaft $g$, bevel-pinion $h$, and bevel-pinion $i$ on the axle, imparts a rotary motion toward each other of the husking-rolls $a$ and $e$ as the machine is moved forward. The husking-rolls $a$ and $e$ are of peculiar conformation. The roll $a$ consists of a series of curved surfaces intersecting each other in longitudinal lines or edges $h'$, the radii of which are greater than the radii of intermediate points in the convex curve joining the edges $h'$ $h'$. The husking-roll $e$ is similarly formed, but, in lieu of the edges $h'$, is provided with offsets or projections $j$ at the termination of the curved surfaces, the offsets or projections $j$ in the revolution of the rolls lying opposite the edges $h'$, whereby the ear and husk are seized near the butt of the ear by the offset and edge of the rolls, and in the revolution forced to fall down into the openings between the rolls, and the ear in the further revolution of the rolls is forced or pushed out of its husk. $k$ $k$ are boards or plates secured to the frame and intersecting each other, forming a receptacle, $d$, for the husked ears.

To the back of the feed-wheel is secured the pulley $l$, from which passes an endless chain or belt, $x$, passing also around a pulley, $m$, connected by a ball-and-socket joint with a shaft, $n$, having at its rear end a pulley, $o$, connected by an endless chain with a pulley, $p$, having on its back face a bevel-pinion, $q$, gearing into a pinion, $r$, on the inclined shaft $g$, whereby the endless chain $x$ is operated. An elevator consisting of an endless chain provided with side-boards and secured to and driven by the shaft $n$ is employed to conduct the husked ears to a wagon or other vehicle driven alongside the machine.

To the forward end of the inclined bar, to which the gathering-reel is pivoted, and to the fender-brace, are secured the inclined plates $y$ $y'$. $z$ is a curved guard bolted to said inclined bar at one end, and to the upper end of the plate $y$ at the other, to prevent the stalks from being carried over and engaging with the curved arms of the gathering-reel.

In practice the machine moving through the field with the lower ends of the husking-rolls in line, or nearly so, with a corn-row, the gathering-reel will raise any inclined or down stalks, and, in conjunction with the fender, will support and guide the stalks to the recessed feed-wheel, which, in its revolution, carries one or more stalks held in a recess to the husking-rolls, which, in their revolution, husk the corn and deposit it in the receptacle $a'$, from whence it is conducted by the endless chain to the elevator described, and thence to a wagon, to be conveyed from the field.

It will be observed that the husking-rolls are situated in an inclined plane forming an angle of about forty-five degrees out and downward, and the gathering-reel shaft forms an upward and outward angle with the main frame.

What I claim as new is—

1. The combination, with revolving husking-roll $a$, having its periphery composed of a series of convex curved surfaces intersecting each other in right-line edges $h$, of the revolving husking-roll $e$, provided with shoulders $j$, substantially as described, and for the purpose set forth.

2. The combination, with revolving husking-rolls $a$ $e$, constructed as set forth, of the recessed feed-wheel G constructed as set forth, substantially as described, and for the purpose set forth.

3. The combination of the husking-rolls $a$ $e$, constructed as set forth, recessed feed-wheel G, and gathering-reel U, substantially as described.

4. The combination, with the husking-rolls $a$ $e$, constructed as set forth, of the gathering-reel U, provided with curved arms V, and inclined fender L, substantially as described, and for the purpose set forth.

5. The combination, with the gathering-reel U, having curved arms V, of the inclined husking-rolls $a$ $e$ and guard Z, substantially as described.

6. The combination, with the husking-rolls $a$ $e$, of the recessed wheel G, carrying the pulley $l$ on its axle, endless chain $x$, pulley $m$, and receptacle $a'$, substantially as described, and for the purpose set forth.

CHARLES A. PENNINGTON.

Witnesses:
SOLON C. KEMON,
CHAS. A. PETTIT.